United States Patent
Sun et al.

(10) Patent No.: US 10,169,628 B1
(45) Date of Patent: Jan. 1, 2019

(54) SCANNING IMAGE CODES IN VIRTUAL MOBILE INFRASTRUCTURES

(71) Applicant: Trend Micro Incorporated, Tokyo (JP)

(72) Inventors: Junwen Sun, Nanjing (CN); Chengkai Tao, Nanjing (CN); Xinxin Fang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 15/892,084

(22) Filed: Feb. 8, 2018

(51) Int. Cl.
| | |
|---|---|
| H04M 1/02 | (2006.01) |
| G06K 7/14 | (2006.01) |
| H04N 5/232 | (2006.01) |
| H04M 1/03 | (2006.01) |
| G06K 7/10 | (2006.01) |

(52) U.S. Cl.
CPC ........ G06K 7/1417 (2013.01); H04M 1/0202 (2013.01); H04N 5/23293 (2013.01); *G06K 2007/10524* (2013.01)

(58) Field of Classification Search
CPC .............. G06K 7/1417; H04M 1/0202; H04N 5/23293
USPC ....................................................... 455/556.1
See application file for complete search history.

(56) References Cited

U.S. PATENT DOCUMENTS

| | | | |
|---|---|---|---|
| 9,225,799 B1 | 12/2015 | Dong et al. | |
| 9,444,912 B1 | 9/2016 | Chen et al. | |
| 2013/0167208 A1* | 6/2013 | Shi | H04L 63/18 726/5 |
| 2014/0164580 A1* | 6/2014 | Cheloff | H04L 41/0803 709/220 |
| 2018/0114207 A1* | 4/2018 | Budde | G06Q 20/1085 |

* cited by examiner

*Primary Examiner* — Lee Nguyen
(74) *Attorney, Agent, or Firm* — Okamoto & Benedicto LLP

(57) ABSTRACT

A virtual mobile infrastructure includes mobile devices and server computers. A server computer runs multiple mobile operating systems. A quick response (QR) scan app runs on one of the mobile operating systems. A mobile device takes a photo of a QR code, decodes the QR code to generate a QR scan result, and provides the QR scan result to the server computer. There, the QR scan result is encoded into another QR code and camera data of the other QR code is provided to the remote QR scan app for scanning and processing.

20 Claims, 5 Drawing Sheets

SCANNING IMAGE CODES IN VIRTUAL MOBILE INFRASTRUCTURES

BACKGROUND OF THE INVENTION

1. Field of the Invention

The present invention relates generally to mobile devices, and more particularly but not exclusively to computing infrastructures for supporting operation of mobile devices.

2. Description of the Background Art

Mobile devices, such as smartphones and tablets, have become commonplace and are now employed as replacements for portable (e.g., laptops and netbooks) and desktop (e.g., personal computers) computing devices. For example, smartphones are now employed not just to make voice calls over traditional mobile telephone networks, but also to browse the Internet, watch streamed video, and play online games. The number of mobile apps for mobile operating systems is growing each day.

Despite their increasing sophistication, mobile devices have limited computing resources relative to portable and desktop computing devices. Accordingly, mobile devices run mobile operating systems, such as the ANDROID and the iOS operating systems. An application program suitable for a mobile operating system is referred to as a "mobile app" or simply as an "app." Apps may be obtained from an app store, such as the GOOGLE app store and AMAZON app store for ANDROID-based mobile devices and the APPLE app store for iOS-based mobile devices.

Virtual mobile infrastructures comprising one or more server computers that each hosts a plurality of mobile operating systems have been developed to allow users of mobile devices to access mobile apps that run on the server computers. That is, instead of executing a mobile app in a mobile device of a user, the mobile app is executed in a server computer of the virtual mobile infrastructure. The user employs his mobile device to interact remotely with the mobile app. Example virtual mobile infrastructures are disclosed in commonly-assigned U.S. Pat. No. 9,444,912, U.S. Pat. No. 9,225,799, U.S. Pat. No. 9,654,603, and U.S. Pat. No. 9,300,720, the contents of which are incorporated herein by reference in their entirety.

Embodiments of the present invention facilitate scanning and processing of an image code, such as Quick Response (QR) code, in a virtual mobile infrastructure.

SUMMARY

In one embodiment, a virtual mobile infrastructure includes mobile devices and server computers. A server computer runs multiple mobile operating systems. A quick response (QR) scan app runs on one of the mobile operating systems. A mobile device takes a photo of a QR code, decodes the QR code to generate a QR scan result, and provides the QR scan result to the server computer. There, the QR scan result is encoded into another QR code and camera data of the other QR code is provided to the remote QR scan app for scanning and processing.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Data (which may be numeric, alphanumeric, byte, binary, or other form) may be encoded into an image, which is referred to herein as an "image code." Quick response (QR) codes are very popular image codes employed with mobile devices. QR codes have been used to encode Uniform Resource Locators (URLs), product prices, inventory numbers, names, and various other data. Generally speaking, the original data is encoded into a QR code, which is printed on a surface or displayed on a display monitor. The QR code is "scanned" by taking a photo of the QR code using a built-in camera of a mobile device. A QR scan app receives camera data of the photo, finds the QR code in the camera data, and decodes the QR code to recover the original data. The QR scan app or another mobile app uses the recovered original data. For example, the QR scan app may direct a web browser to a webpage when the original data is a URL of the webpage.

One problem with remotely running a mobile app is that network bandwidth and latency may limit the size of camera data that may be transmitted from the mobile device to the server computer that runs the mobile app. More particularly, camera data of high-resolution photos are relatively large and take some time to transmit from the mobile device to the server computer. The resulting lag is distracting to the user, as the user now experiences the effect of running the mobile app remotely, instead of locally in the mobile device. Accordingly, a mobile device of a virtual mobile infrastructure typically compresses camera data before the camera data is sent to the server computer. Compressed camera data is relatively small and thus allows for faster transmission time. However, processing of QR code scans is unreliable with compressed camera data.

Figure 1:
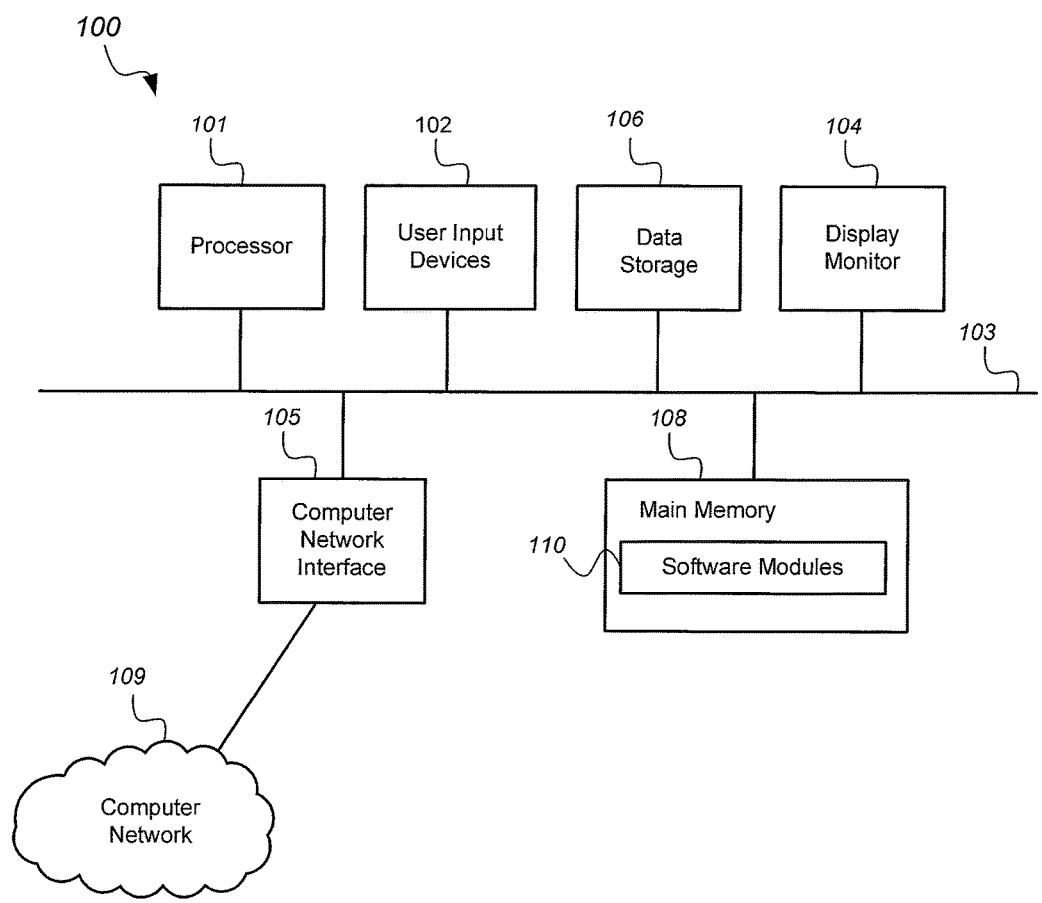
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a mobile device or a server computer of a virtual mobile infrastructure as described below. The computer 100 may have fewer or more components to meet the needs of a particular application. The computer 100 may include a processor 101. The processor 101 may comprise an ARM processor when the computer 100 is a mobile device or an x86 processor when the computer 100 is a server computer, for example. The computer 100 may have one or more buses 103 coupling its various components. The computer 100 may include one or more user input devices 102 (e.g., keyboard, touchscreen), one or more data storage devices 106 (e.g., flash memory, universal serial bus (USB) drive), a display monitor 104 (e.g., touchscreen, liquid crystal display), one or more communications interfaces 105 (e.g., network adapter, cellular interface), and a main memory 108 (e.g., random access memory). The computer 100 is a particular machine as programmed with software modules 110. The software modules 110 comprise computer-readable program code stored non-transitory in the main memory 108 for execution by the processor 101.

Figure 2:
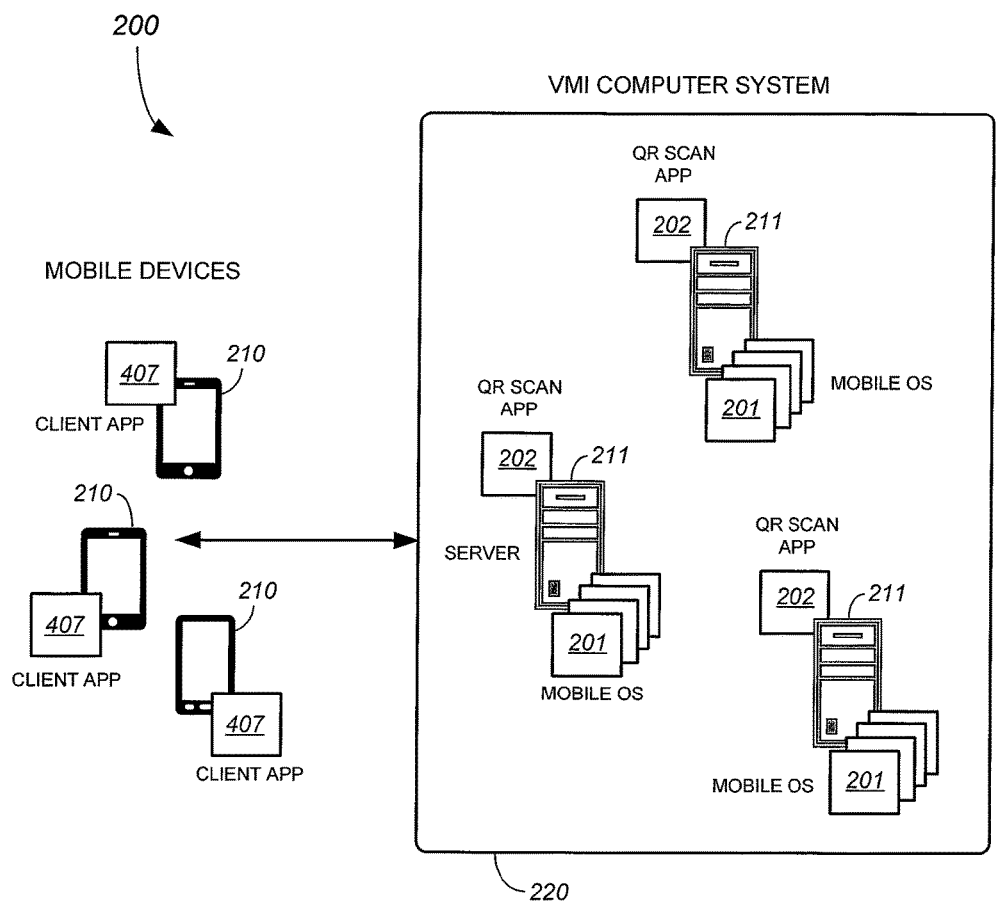
FIG. 2 shows a schematic diagram of a virtual mobile infrastructure in accordance with an embodiment of the present invention.

FIG. 2 shows a schematic diagram of a virtual mobile infrastructure 200 in accordance with an embodiment of the present invention. In one embodiment, the virtual mobile infrastructure 200 is similar to those disclosed in U.S. Pat. No. 9,444,912, U.S. Pat. No. 9,225,799, U.S. Pat. No. 9,654,603, and U.S. Pat. No. 9,300,720, with appropriate changes as disclosed below. Communications between components of a mobile device 210 and components of a server computer 211 may be performed as described in the aforementioned US patents, or some other way without detracting from the merits of the present invention.

As will be more apparent below, the virtual mobile infrastructure 200 of FIG. 2 differs from those disclosed in the aforementioned US patents by including features for scanning and processing QR codes. In the example of FIG. 2, a server computer 211 may include an app in the form of a QR scan app 202 for scanning and processing QR codes. A mobile device 210 may include a client app 407 for scanning and processing QR codes and transmitting corresponding QR scan results to the server computer 211.

In the example of FIG. 2, the virtual mobile infrastructure 200 includes a virtual mobile infrastructure (VMI) computer system 220. The VMI computer system 220 may include a plurality of server computers 211, with each server computer 211 running a plurality of mobile operating systems 201. One or more mobile devices 210 remotely access mobile apps running on the server computers 211.

Generally speaking, as its name implies, a mobile operating system is an operating system designed to run on a mobile device, which may be a smartphone or a tablet. A mobile operating system is lightweight in that it consumes less computing resources, such as processor and memory resources, compared to a desktop operating system. In the case of a smartphone or a tablet with suitable connectivity, a mobile operating system may also support communications over a mobile phone network, such as a cellular network, to provide telephony.

In one embodiment, a server computer 211 comprises a single LINUX operating system server that runs several mobile operating systems 201 in the form of ANDROID operating systems, with each ANDROID operating system being implemented on a LINUX container. A mobile operating system 201 is also referred to herein as a "remote mobile operating system" to distinguish it from a corresponding mobile operating system running on a mobile device. In general, components on a mobile device are referred to herein as "local" components, and components on a server computer are referred to herein as "remote" components.

A mobile device 210 may communicate with the VMI computer system 220 to access one of a plurality of remote mobile operating systems 201 running on a server computer 211 over a computer network, which may include the Internet and/or a private computer network. A mobile operating system 201, which comprises the ANDROID operating system in this example, includes a plurality of mobile apps. A user of the mobile device 210 accesses the mobile apps on the remote ANDROID operating system as if the mobile apps are running on the mobile device 210. For example, the screen image of the remote ANDROID operating system is displayed on the touchscreen of the mobile device 210. The user may even replace the mobile device 210 with another mobile device 210 to access the same mobile apps on the same remote ANDROID operating system. This is particularly advantageous in workplaces that allow employees to use their own personal mobile devices. In particular, employees with different mobile devices 210 can work on mobile apps running on remote mobile operating systems that are owned and managed by their employers.

Figure 3:
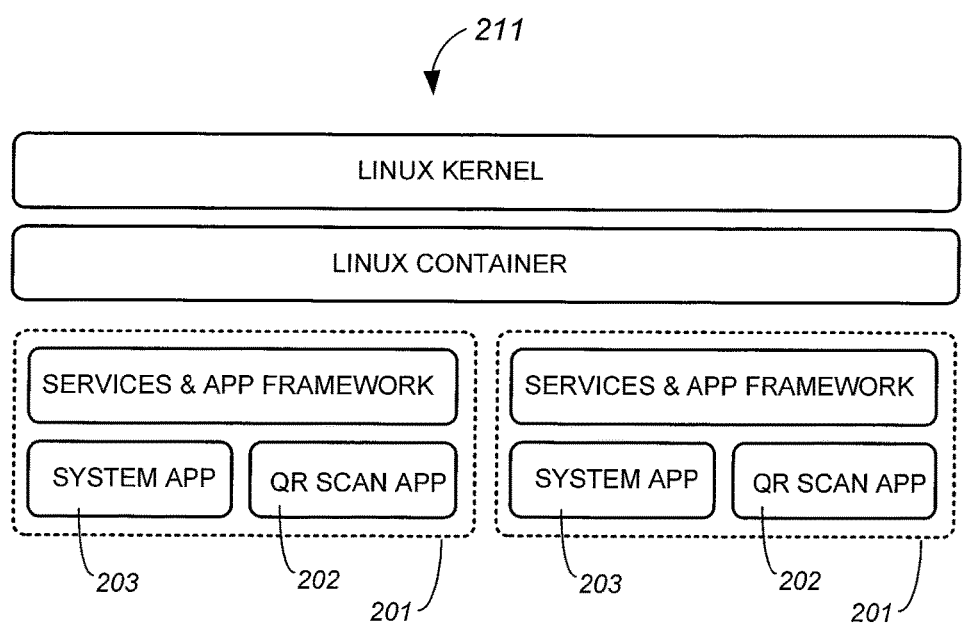
FIG. 3 shows a block diagram of a mobile operating system in accordance with an embodiment of the present invention.

FIG. 3 shows a block diagram of a mobile operating system 201 in accordance with an embodiment of the present invention. In the example of FIG. 3, a server computer 211 has an x86 processor and runs a Linux operating system with corresponding Linux kernel. As explained, the server computer 211 runs a plurality of mobile operating systems 201, with each mobile operating system 201 running on a Linux container.

In the example of FIG. 3, the mobile operating system 201 is an ANDROID operating system, with corresponding services and application framework (e.g., system layer, kernel layer). The ANDROID operating system application layer includes a plurality of apps, which in one embodiment includes a system app 203 and a QR scan app 202. Other apps that may be running on the ANDROID operating system are not shown for clarity of illustration.

The system app 203 may be configured to communicate with a client app (e.g., see FIG. 4, client app 407) to facilitate scanning and processing of QR codes. The QR scan app 202 may comprise a commercially-available QR scan app. As will be more apparent below, embodiments of the present invention allow usage of pre-existing QR scan apps with no or little modification.

Figure 4:
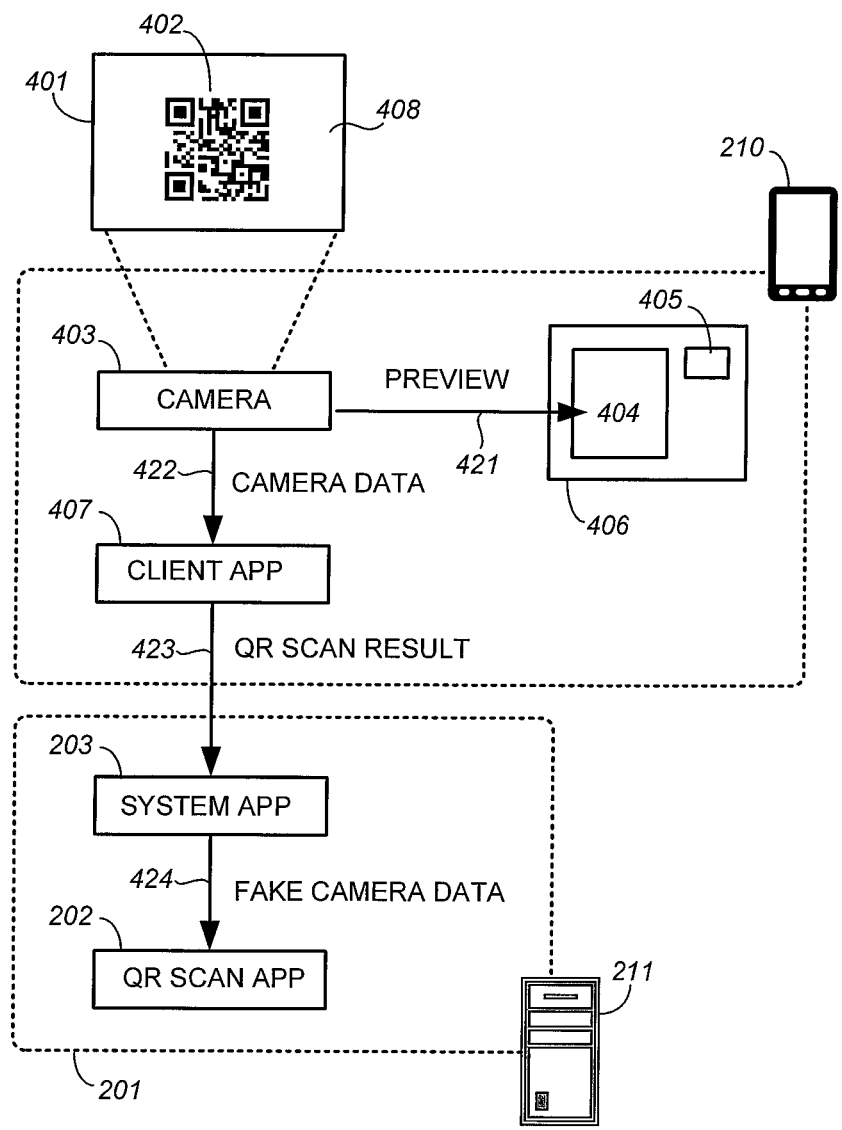
FIG. 4 shows a flow diagram of a method of scanning an image code in a virtual mobile infrastructure in accordance with an embodiment of the present invention.

FIG. 4 shows a flow diagram of a method of scanning an image code in a virtual mobile infrastructure in accordance with an embodiment of the present invention. In the example of FIG. 4, a mobile device 210 includes a built-in camera 403 and runs a client app 407. The server computer 211 runs the system app 203 and the QR scan app 202 on a mobile operating system 201. The mobile device 210 and the server computer 211 may communicate over the Internet.

In the example of FIG. 4, original data is encoded into a QR code 402. The user of the mobile device 210 positions the built-in camera 403 of the mobile device 210 to take a photo 401 of the QR code 402. The client app 407 may display a window 406, which includes a preview area 404 that shows a preview of the photo 401 (see arrow 421). The window 406 may also include a button 405 (or other user interface) that may be activated by the user to indicate that the user would like to take a high-resolution e.g., 640×480, photo 401 of the QR code 402. This may be necessary in virtual mobile infrastructures that only take low-resolution photos by default to minimize network bandwidth usage. In response to activation of the button 405, the camera 403 takes the high-resolution photo 401, which may include not only the QR code 402 but also its surroundings 408. The camera 403 outputs camera data of the photo 401 (see arrow 422).

In one embodiment, the client app 407 is configured to receive the camera data of the photo 401, find the QR code 402 in the camera data, and decode the QR code 402 to generate a QR scan result (see arrow 423). The QR scan result comprises the original data that was encoded into the QR code 402. For example, when the original data is a URL, the QR scan result of decoding the QR code 402 is the URL. The client app 407 transmits the QR scan result to the server computer 211 over the Internet. Advantageously, the size of the QR scan result is a lot smaller than the size of the camera data of the photo 401, making the QR scan result much more efficient to send over a computer network.

In the server computer 211, the system app 203 running on the mobile operating system 201 receives the QR scan result. The system app 203 encodes the QR scan result into a pure QR code. The pure QR code is "pure" in that it is just the QR code, i.e., without extraneous images, such as surroundings etc. A pure QR code is thus easier for the QR scan app 202 to recognize. The system app 203 generates fake camera data that depicts the pure QR code (see arrow 424). The fake camera data is "camera data" in that it is in a camera format, but is "fake" in that it is not generated by a camera. For example, the fake camera data does not necessarily depict the surroundings 408 of the photo 401. The system app 203 provides the fake camera data to the QR scan app 202. The QR scan app 202 scans the fake camera data to find the pure QR code, and decodes the pure QR code to recover the original data.

Figure 5:
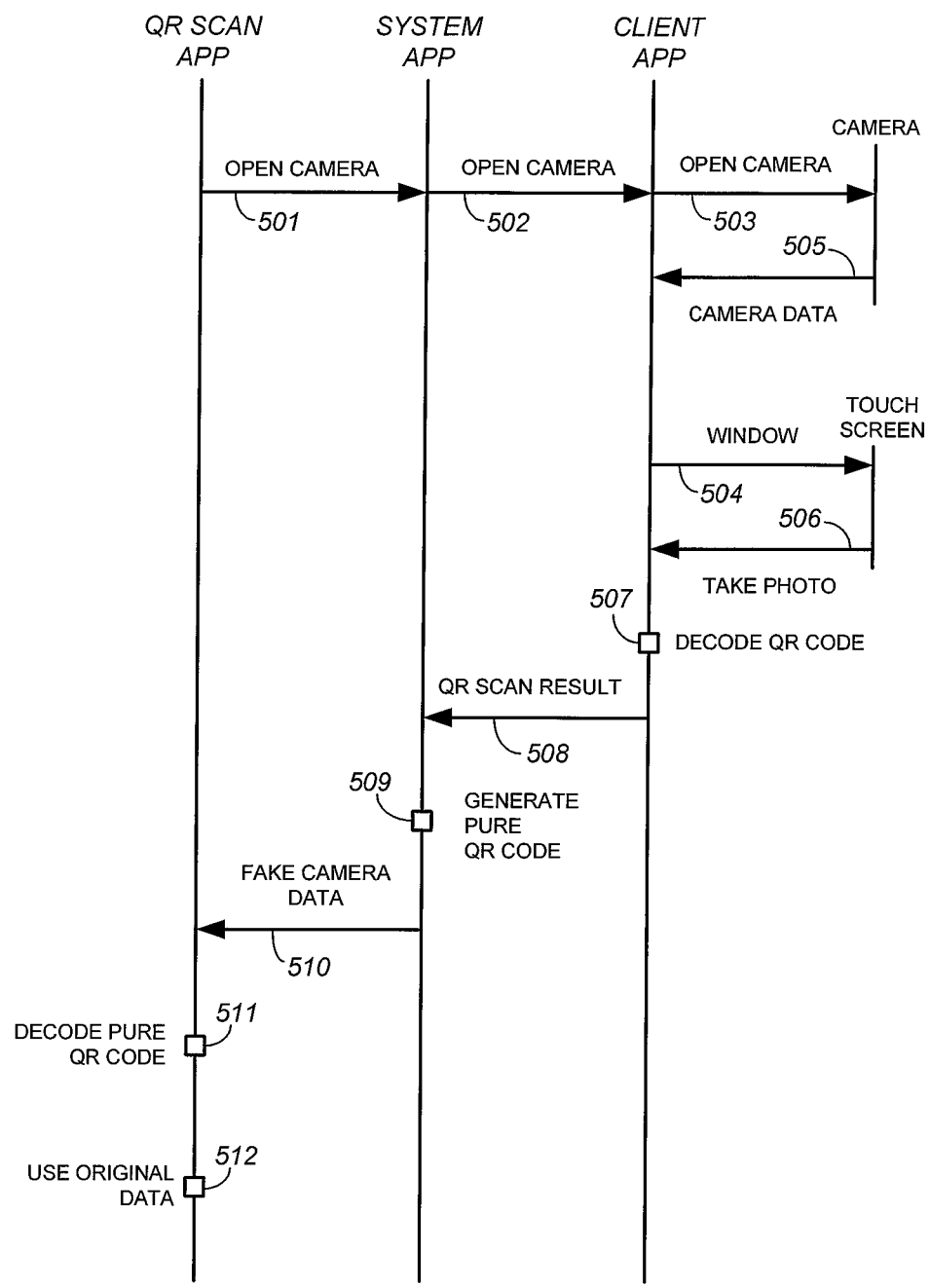
FIG. 5 shows a call diagram of a method of scanning an image code in a virtual mobile infrastructure in accordance with an embodiment of the present invention.

FIG. 5 shows a call diagram of a method of scanning an image code in a virtual mobile infrastructure in accordance with an embodiment of the present invention. The method of FIG. 5 is explained using the components shown in FIG. 4. As can be appreciated, other components may also be employed without detracting from the merits of the present invention.

In the example of FIG. 5, the QR scan app 202 sends an open camera command to open the camera 403 of the mobile device 210 (see arrow 501). The QR scan app 202 may open the camera 403 when the QR scan app 202 is launched, which may be initiated by the user of the mobile device 210. The system app 203 receives the open camera command from the QR scan app 202 and forwards the open camera command to the client app 407 (see arrow 502). In response to receiving the open camera command from the system app 203, the client app 407 opens the camera 403 (see arrow 503). The camera 403 thereafter starts generating camera data of a photo of a QR code 402 that is in front of the lens of the camera 403 (see arrow 505).

The client app 407 displays a window 406 on the touchscreen of the mobile device 210 (see arrow 504). The window 406 includes a preview area 404 that shows a preview of the photo of the QR code 402. The user may activate a button 405 of the window 406 to take a high-resolution photo of the QR-code 402 (see arrow 506). In response to the user activation of the button 405, the camera 403 takes the high-resolution photo of the QR code 402 and provides the corresponding camera data to the client app 407. The client app 407 receives the camera data, finds the QR code 402 in the camera data, and decodes the QR code 402 (see 507) to generate a QR scan result. The client app 407 sends the QR scan result, instead of the camera data of the photo 401, to the system app 203 (see arrow 508).

The system app 203 receives the QR scan result, and encodes the QR scan result into a pure QR code (see 509). The system app 203 generates fake camera data of the pure QR code (see arrow 510). The QR scan app 202 receives the fake camera data, finds the pure QR code in the fake camera data, and decodes the pure QR code back to the original data (see 511). The QR scan app 202, or another remote mobile app, uses the original data (see 512). For example, the QR scan app 202 may display the original data, fill in a list or input field with the original data, and so on. As another example, the original data may be a URL. In that case, a web browser (not shown) may be directed to a webpage with the URL.

Methods and systems for scanning image codes have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of scanning an image code, the method comprising:
    taking, using a camera of a smartphone, a photo of a first quick response (QR) code;
    finding, by the smartphone, the first QR code in the photo;
    decoding, by the smartphone, the first QR code found in the photo to generate a QR scan result;
    forwarding, by the smartphone, the QR scan result to a server computer over a computer network;
    encoding, by the server computer, the QR scan result into a second QR code;
    generating, by the server computer, camera data of the second QR code; and
    providing, by the server computer, the camera data to a QR scan app running on the server computer.

2. The method of claim 1, wherein the QR scan app is running on one of a plurality of mobile operating systems running on the server computer.

3. The method of claim 1, wherein forwarding, by the smartphone, the QR scan result to the server computer comprises:
    forwarding, by the smartphone, the QR scan result to one of a plurality of mobile operating systems running on the server computer.

4. The method of claim 1, wherein the QR scan result comprises a uniform resource locator (URL).

5. The method of claim 1, further comprising:
    showing, by the smartphone, on a window displayed on a touchscreen of the smartphone a preview of the photo.

6. The method of claim 5, further comprising:
    taking, by the smartphone, the photo in response to a user activation of a user interface on the window.

7. The method of claim 6, wherein the user interface comprises a button.

8. A virtual mobile infrastructure comprising:
    a mobile device comprising a camera that is configured to take a photo of a first quick response code (QR), the mobile device having a memory and a processor, the memory of the mobile device storing instructions that when executed by the processor of the mobile device cause the mobile device to find the first QR code in the photo, generate a QR scan result by decoding the first QR code, and forward the QR scan result to a server computer; and
    the server computer comprising a memory and a processor, the memory of the server computer storing instructions that when executed by the processor of the server computer cause the server computer to run a plurality of mobile operating systems, receive the QR scan result in a mobile operating system among the plurality of mobile operating systems, generate a second QR code by encoding the QR scan result, and provide camera data of the second QR code to a QR scan app running on the mobile operating system.

9. The virtual mobile infrastructure of claim 8, wherein the mobile device is a smartphone.

10. The virtual mobile infrastructure of claim 8, wherein the mobile device is a tablet.

11. The virtual mobile infrastructure of claim 8, wherein the mobile device forwards the QR scan result to the server computer over the Internet.

12. A computer-implemented method of scanning an image code, the method comprising:
    taking, by a mobile device, a photo of a first image code of an original data;
    finding, by the mobile device, the first image code in camera data of the photo;
    recovering, by the mobile device, the original the data by decoding the first image code;
    forwarding, by the mobile device, the original data to a server computer;
    encoding, by the server computer, the original data into a second image code;
    generating, by the server computer, camera data of the second image code; and
    providing, by the server computer, the camera data of the second image code to a scan app running on the server computer.

13. The method of claim 12, wherein the scan app is running on one of a plurality of mobile operating systems of the server computer.

14. The method of claim 12, wherein forwarding, by the mobile device, the original data to the server computer comprises:
    forwarding, by the mobile device, the original data to the server computer over the Internet.

15. The method of claim 12, wherein forwarding, by the mobile device, the original data to the server computer comprises:
    forwarding, by the mobile device, the original data to one of a plurality of mobile operating systems running on the server computer.

16. The method of claim 12, wherein the first image code is a quick response (QR) code and the scan app is a QR scan app.

17. The method of claim 12, wherein the original data is a uniform resource locator (URL).

18. The method of claim 17, wherein a web browser is directed to a webpage having the URL.

19. The method of claim 12, further comprising:
    showing, by the mobile device, on a window displayed on a touchscreen of the mobile device a preview of the photo of the first image code.

20. The method of claim 19, further comprising:
    taking, by the mobile device, the photo of the image code in response to a user activation of a user interface on the window.

\* \* \* \* \*